United States Patent [19]

O'Rourke

[11] Patent Number: 5,467,741
[45] Date of Patent: Nov. 21, 1995

[54] DOG CHEW TOY FOR CANINE DENTAL CARE AND METHODS FOR MAKING CHEW TOY

[75] Inventor: Anthony O'Rourke, Malibu, Calif.

[73] Assignee: Booda Products, Inc., Gardena, Calif.

[21] Appl. No.: 162,346

[22] Filed: Dec. 2, 1993

Related U.S. Application Data

[63] Continuation-in-part of Ser. No. 938,282, Aug. 31, 1992, Pat. No. 5,329,881, and a continuation-in-part of Ser. No. 69,702, Jun. 1, 1993, which is a continuation-in-part of Ser. No. 932,770, Aug. 20, 1992, Pat. No. 5,215,038.

[51] Int. Cl.$^6$ .................................................. A01K 29/00
[52] U.S. Cl. .................................................. 119/710
[58] Field of Search .................................. 119/709, 710; 132/321

[56] References Cited

U.S. PATENT DOCUMENTS

| | | | |
|---|---|---|---|
| 1,149,170 | 8/1915 | Allis | 119/710 |
| 4,364,925 | 12/1982 | Fisher | 119/710 X |
| 4,557,219 | 12/1985 | Edwards | 119/710 X |
| 5,033,410 | 7/1991 | Sigurdsson | 119/710 |

*Primary Examiner*—Robert P. Swiatek
*Attorney, Agent, or Firm*—Lyon & Lyon

[57] ABSTRACT

A chew toy for dogs comprised of a plurality of strands of soft pliable threads twisted about one or more strands of twisted or synthetic fibers so as to substantially encase and retain the fibers within the pliable threads. The twisted fibers are impregnated with one or more therapeutic dental agents such as fluoride and/or a breath freshening or flavoring agent so as to dispose the agent or agents within and along the length of the chew toy. Upon being chewed by a dog, the strands of soft pliable threads will provide a cleaning of the dog's teeth and a massaging of its gums and a portion of the impregnated agent or agents will be released onto the teeth and gums of the dog.

45 Claims, 3 Drawing Sheets

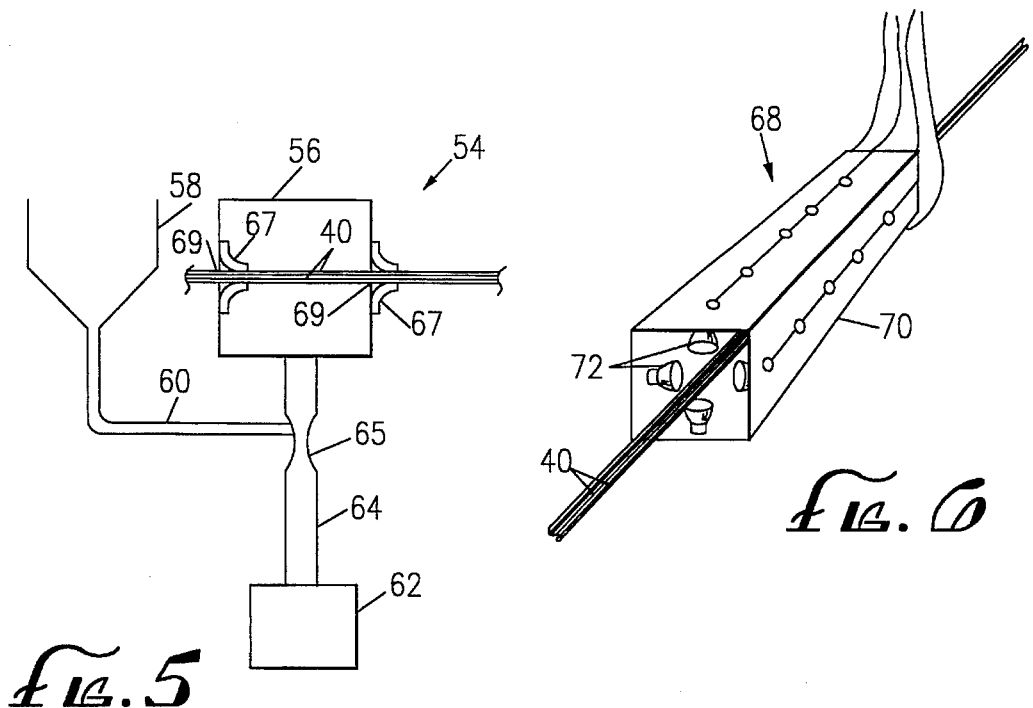
fig.5
fig.6
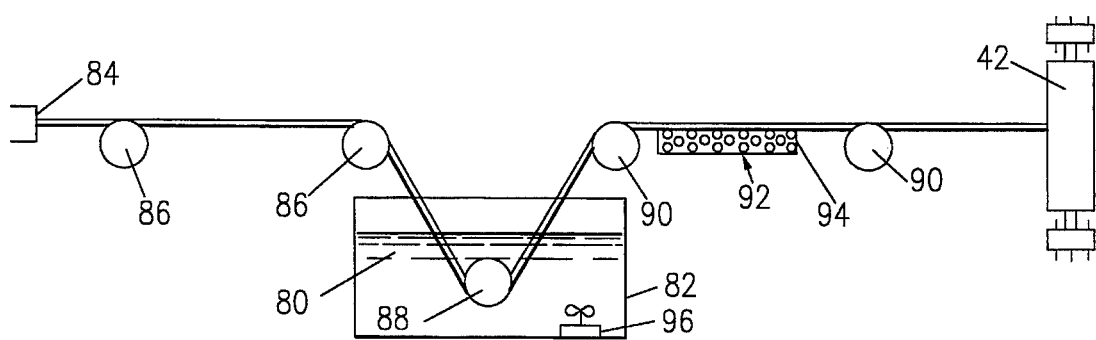
fig.7

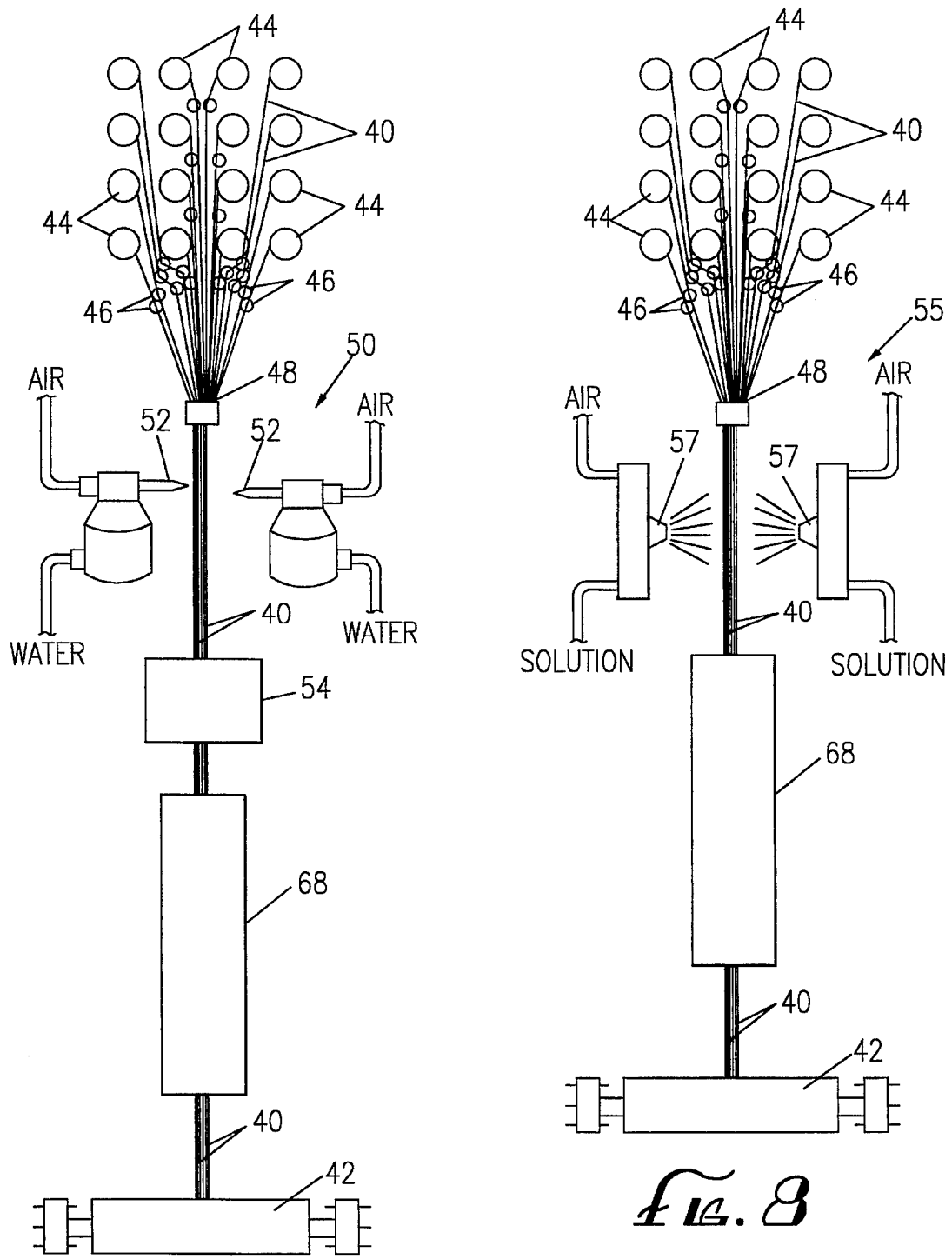

5,467,741

DOG CHEW TOY FOR CANINE DENTAL CARE AND METHODS FOR MAKING CHEW TOY

This is a continuation-in-part both of U.S. Pat. No. 5,329,881, filed Aug. 31, 1992, issued Jul. 19, 1994, application Ser. No. 07/938,282, filed Aug. 31, 1992, and entitled Dog Chew Toy for Canine Dental Care and Methods for Making Chew Toy, and of pending application Ser. No. 08/069,702, filed Jun. 1, 1993 and entitled Dog Chew Toy. Application Ser. No. 08/069,702 is a continuation-in-part of U.S. Pat. No. 5,215,038, Ser. No. 932,770, filed Aug. 20, 1992 and issued Jun. 1, 1993.

BACKGROUND OF THE INVENTION

The present invention relates to a novel chew toy for dogs for improving canine teeth care. In recent years, veterinarians have become increasingly aware of the need for improved canine dental care. Many veterinarians are recommending the regular brushing of a dog's teeth to prevent decay and gum disease. Such a practice, however, is distasteful to many pet owners and not generally enjoyed by dogs. As a result, such recommendations have been largely ignored and a dog's teeth are generally ignored by its owner until a problem arises.

A popular chew toy for dogs previously developed by applicant comprises a short length of cotton rope having large knots formed near the ends thereof so as to resemble a classic dog bone configuration. The soft cotton rope provides a cleaning and flossing of the dog's teeth and a gentle massaging of the dog's gums when chewed and thus provides therapeutic dental benefits as well as playful enjoyment for the dog. To make such a therapeutic chew toy more appealing to dogs and overcome the disadvantages of a cotton chew toy, applicant developed a method for providing the cotton toy with a fibrous core, preferably formed of natural plant fibers such as sisal. The addition of the fibrous core provided the toy with an attractive crunching sound and texture when chewed. The core also provided ventilation through the toy when wetted with a dog's saliva to inhibit bacterial growth. When chewed over a period of time, the core would fracture, rendering the toy more pliable so that it could pass more readily through the dog if ingested. Different embodiments of this composite chew toy and methods for making the toy are the subject of applicant's co-pending application Ser. No. 08/069,702 filed Jun. 11, 1993 and entitled Dog Chew Toy and applicant's U.S. Pat. No. 5,215,038.

While providing an excellent means for cleaning the dog's teeth and promoting healthful gums, such devices do not provide a complete solution to the problem of canine tooth care. Just as fluoride is now universally recognized as a necessary element of human dental care, it would also be highly beneficial for canine dental care. Unfortunately, there does not currently exist an acceptable means for applying fluoride to a dog's teeth. Based on past experiences, brushing a dog's teeth with a cleaning agent containing fluoride would not present an acceptable method to pet owners. Regular fluoride applications by a veterinarian would be too expensive for most pet owners. The present invention overcomes these problems by providing a vehicle for the fluoride which requires no effort on the part of the dog owner, is inexpensive and highly attractive to dogs.

In addition to fluoride, a complete dental care program includes tartar and plaque control. A build-up of tartar or plaque between the teeth and gums can cause the gums to separate from the teeth and lead to tooth decay and gum disease. The chew toy of the present invention also provides a vehicle for agents known to inhibit the build-up of tartar and plaque on teeth and thereby provides dog owners with an inexpensive and very convenient means for maintaining their pets' teeth and gums in a healthy condition.

A somewhat related problem to tooth and gum care of which pet owners are acutely aware is canine halitosis. The chew toy of the present invention not only inhibits the growth of bacteria which cause the problem, but can also serve as an effective vehicle for a breath freshener.

SUMMARY OF THE INVENTION

Briefly, the present invention is directed to a therapeutic chew toy for dogs comprised of a plurality of cotton or other soft pliable threads twisted about and substantially encasing a plurality of natural or synthetic fibers impregnated with fluoride and/or one or more other dental care or breath freshening agents. The soft cotton threads in the outer portion of the composite toy provide a cleaning and flossing of the dog's teeth and a gentle massaging of its gums when chewed or otherwise used by the dog as an interactive toy for playful tugging with humans. The outer threads also retain the fibers carrying the dental care and/or breath freshening agents within the interior of the toy such that the agents can slowly migrate throughout the toy when chewed for effective transfer to the dog's teeth and gums and thereby prolong the therapeutic life of the toy. In addition to carrying the therapeutic agents, the encased fibers promote drying of the toy when wetted with the dog's saliva to inhibit bacteria growth, facilitate the ability of the dog to pass the toy if ingested after chewing, and can provide the toy with an attractive sound and texture to promote the use of the toy by the dog. Thus, the toy of the present invention provides the dog with a complete dental program.

The chew toy of the present invention is preferably formed by impregnating one or more strands of twisted natural or synthetic fibers with the desired therapeutic agent or agents or, alternatively, impregnating the individual threads of twisted fibers and forming the impregnated threads into one or more strands of twisted impregnated fibers. A plurality of skeins of twisted cotton or other soft pliable threads can then be twisted about the strand or strands of impregnated fibers in a conventional rope forming pattern so as to form a length of rope having an impregnated central core. The composite rope is then cut and formed into the desired chew toy configuration. In a second and preferred configuration, a plurality of soft pliable threads are twisted about the core of impregnated fibers so as to form an impregnated composite skein. Three such skeins are then twisted together in a conventional rope forming process to form a length of composite impregnated rope. The composite rope is then cut and formed into the desired chew toy configuration.

It is the principal object of the present invention to provide a chew toy for dogs for improving canine teeth care.

It is another object of the present invention to provide an improved means for regularly applying fluoride to a dog's teeth.

It is yet another object of the present invention to provide a chew toy for dogs impregnated with one or more selected therapeutic agents for canine tooth care.

It is a further object of the present invention to provide a chew toy for dogs which provides a gentle cleaning and flossing of the dog's teeth, a gentle message of its gums and which releases one or more selected therapeutic agents to the dog's teeth and gums as the toy is chewed and/or tugged by the dog.

These and other objects and advantages of the present invention will become readily apparent from the following description taken in conjunction with the accompanying drawings.

DESCRIPTION OF THE PREFERRED EMBODIMENTS IN THE DRAWINGS

FIG. 4 is a schematic representation of a process for applying the fluoride and/or other agents onto the threads in forming the chew toy of the present invention.

FIG. 5 is a sectional side view of the fluoride spray station.

FIG. 6 is a perspective view of a drying station employed in the process of forming the chew toy of the present invention.

FIG. 7 is a schematic representation of an alternate process for applying the fluoride and/or other agents onto the threads in forming the chew toy of the present invention.

FIG. 8 is a schematic representation of another alternate process for applying the fluoride and/or other agents onto the threads in forming the chew toy of the present invention.

Figure 1:
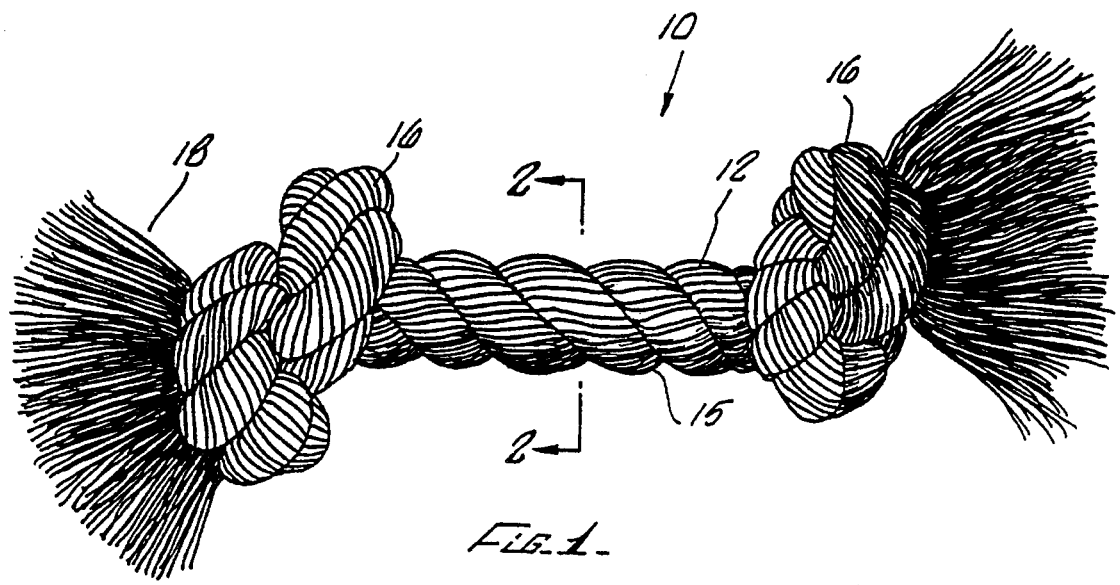
FIG. 1 is a perspective view of the dog chew toy of the present invention.
Figure 2:
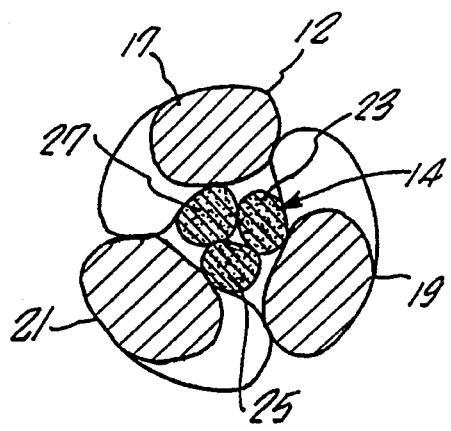
FIG. 2 is a sectional view taken along the line 2—2 of FIG. 1.

Referring now in detail to the drawings, a first embodiment of the chew toy of the present invention is illustrated in FIGS. 1 and 2. As seen therein, the chew toy 10 is comprised of an outer shell 12 defined by three strands or skeins 17, 19 and 21 of twisted threads of a soft pliable material, such as cotton or a cotton and polyester blend, which are twisted together about a centrally disposed inner core 14 in a conventional rope forming pattern to form a length composite rope 15. The core 14 of chew toy 10 is defined by one or more strands of twisted threads of natural or synthetic fibers which have been impregnated with fluoride and/or one or more other dental care or breath freshening agents 16 as will be described later herein. The core 14 illustrated in FIG. 2 comprises three such strands. The impregnated composite rope 15 is then cut and formed into the desired chew toy configuration. In the preferred chew toy configuration shown in FIG. 1, the formed length of impregnated composite rope 15 is cut relatively short and has knots 13 formed proximate its extended ends to prevent the rope from unravelling, secure the impregnated core within the shell and provide the toy with the desired configuration resembling a classic dog bone.

Figure 3:
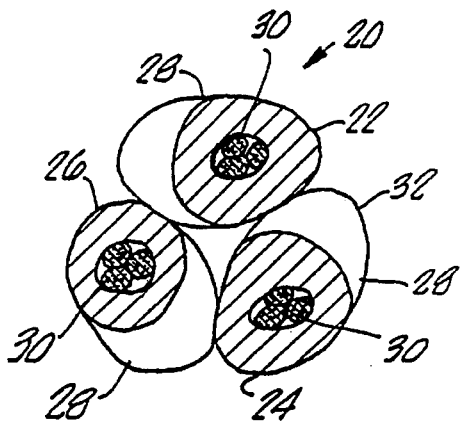
FIG. 3 is a sectional view of an alternate embodiment of the present invention.

An alternate and preferred embodiment of the chew toy of the present invention is illustrated in FIG. 3. This embodiment differs from the prior embodiment in that in lieu of a single impregnated core 14 centrally disposed within an outer cotton rope shell 12, a separate impregnated core is provided in each of the three twisted strands or skeins which comprise the chew toy. As seen in FIG. 3, the chew toy of this alternate embodiment is comprised of three twisted composite strands or skeins 22, 24 and 26 with each skein being formed so as to comprise an outer cotton shell 28 and an impregnated inner core 30. Each of the shells 28 is comprised of a plurality of cotton or other soft pliable threads which are twisted about a core 30. The pattern and process for twisting the threads forming shells 28 about the cores 30 are the same as are commonly used in the formation of a conventional strand or skein of threads for forming a length of rope, the only difference being in that in forming skeins 22, 24 and 26, the cotton threads are twisted about an inner core 30 as opposed to being twisted only about each other. The cores 30 can be constructed, configured and impregnated with one or more therapeutic agents 16 in the same manner as the core 14 of the prior embodiments, except that the individual cores 30 are each of a smaller diameter than the single core 14 to provide a length of composite impregnated rope 32 of the same diameter as rope 15 of the prior embodiment.

The three composite skeins 22, 24 and 26, each with its own outer cotton shell 28 and impregnated inner core 30, are then twisted together in an conventional rope forming pattern to form a length of impregnated composite rope 32. As with the prior embodiment, the formed length of composite impregnated rope 32 is then cut to a desired length and formed into the desired toy configuration, such as that shown in FIG. 1. While both embodiments of the invention encase the impregnated cores over the entire lengths thereof except for the extend ends of the cores and thereby effectively retain the therapeutic agents within the toy, this alternate embodiment has the advantage over the prior embodiment of more effectively dispersing the impregnated cores throughout the formed toy, facilitating access of the impregnated cores to the dog's teeth while making it more difficult for the dog to separate the cotton shell from the core and thereby prolonging the useful life of the toy.

Regardless of the particular chew toy configuration formed with either of the above-described embodiments of the impregnated composite rope, the use of cotton or other soft pliable threads to form the outer shell of the chew toy provides the toy with a soft pliable outer layer of threads which, when chewed, will provide a cleaning and flossing of the dog's teeth and a gentle massaging of its gums. While a wide variety of natural and synthetic materials can be used to form the cores 14 and 30 of the toy for carrying the fluoride and/or other therapeutic agents, the use of one or more strands of natural sisal fibers is particularly well suited for the cores. Sisal provides the toy with a crunchy sound and texture when chewed which has been found to be highly attractive to dogs and has an odor which is also attractive to dogs. A sisal core is less absorbent than the cotton shell and provides ventilation through the toy when wetted with the dog's saliva to promoted drying of the toy which inhibits bacterial growth in the toy. When the toy is chewed over a period of time, a sisal core will slowly fracture and break into small pieces retained within the outer cotton shell. If the chew toy were to be swallowed by a dog, the fractured core will render the toy more pliable, tending to collapse the end knot. As the fractured sisal will not swell but actually begins to degrade within the dog's stomach, the cotton shell will further collapse, thereby enhancing the ability of the dog to pass the toy before any blockage could prevent a health hazard to the dog.

While sisal fibers are preferred for their crunchy texture, frangibility and strength, other species of natural agave plant fibers, such as henequen could be used in the toy core as could other plant fibers such as for example, hemp, jute and manila. If desired, cores 14 and 30 could also be made from synthetic materials such as nylon, orlon and polyester. While not providing all of the desirable characteristics of sisal, such materials, like sisal, are non-swelling when wetted, promote drying of the toy and are well suited for carrying the therapeutic agents interiorly of the outer soft pliable shell 12.

Both of the above described toy configurations and the methods for making the chew toy, absent the addition of the therapeutic agents, are described in detail in patent application, Ser. No. 08/069,702, filed Jun. 1, 1993 and entitled Dog Chew Toy. The teachings of that application are incorporated herein by reference as though fully set forth herein.

While fluoride is the preferred dental care agent carried by chew toy 10, the cores 14 and 30 of the present invention can be impregnated with other therapeutic agents in lieu of or in addition to fluoride. Breath freshening and flavoring agents can also be used. The configuration of the toy 10 and, with certain exceptions, the basic methods for applying the agent or agents to the core do not depend on the particular agent or agents being used. Accordingly, the following description of the chew toy and methods for producing the toy will generally refer to fluoride as the additive agent. It is to be understood, however, that the present invention is not limited to a single agent or type of agent, as will be more fully explained later herein.

In the formation of the chew toy of the present invention, the fluoride and/or other therapeutic agents 16 are applied to the core 14 or cores 30 of the toy so that they will be largely retained in the toy by the outer shell 12 or shells 28. As the dog chews the toy, the agents will be deposited on the dog's teeth and gums, mix with the dog's saliva and achieve their intended purpose. The agent or agents will also be caused to migrate somewhat throughout the toy, including the threads of shells 12 and 28, enhancing their distribution within the toy. Thus, by utilizing the inner core or cores as the agent carrying means and the outer shell or shells as the containment means, the retention time of the therapeutic agent or agents in the toy is increased and the useful therapeutic life of the toy is prolonged.

The fluoride and/or other therapeutic agents can be applied to the core in several ways. With the exception of the use of a dry injection process which will be described later herein, the agents are applied to the core or cores prior to forming the outer shell of soft pliable threads thereover to ensure an even distribution of the therapeutic agent throughout the interior of the toy. When the chew toy core is comprised of natural fibers such as sisal, the fibers are preferably formed into the desired core configuration, i.e., one or more strands of twisted sisal threads, before the therapeutic agents are deposited thereon. However, when the core is comprised of synthetic fibers, the agents can be deposited onto the individual synthetic threads prior to twisting the threads into their desired core configuration, resulting in a more thorough saturation of the core with the therapeutic agent or agents. Such a process is illustrated in FIG. 4.

As seen in FIG. 4, a plurality of threads 40 are individually drawn by a conventional ball warper 42 from their conventional carrying spools 44 over a plurality of following guides 46 to a collecting and spacing guide 48. Guide 48 collects the individual threads 40 and guides and the threads in a slightly spaced array to a misting station 50 where a mist of water is sprayed through one or more nozzles 52 onto the moving threads. The moistened threads are then directed to a spray station 54 where fluoride powder or other therapeutic agent or combination of such agents is sprayed onto the moistened threads 40. By maintaining a slight separation of the threads 40 within spray station 54, the agent particles can be deposited onto the individual threads and thus relatively evenly dispersed throughout the subsequently formed strands of twisted threads for use as a core 14 or 30.

One embodiment of a spray station 54 is illustrated in FIG. 5. As seen therein, the spray station 54 includes a chamber 56 through which the threads 40 pass. A hopper 58 is provided for holding a supply of fluoride powder, which communicates with chamber 56 by means of conduit 60. A blower 62 is disposed below chamber 56 and communicates therewith via conduit 64. Conduit 64 also communicates with conduit 60 and defines a venture nozzle 65 therein for drawing fluoride powder from hopper 58 through conduit 60 into conduit 64, where it is carried into chamber 56 by the air flow from the blower. The venture nozzle 66 is preferably provided with a variable orifice for adjusting the air flow there through to control the amount of fluoride drawn into conduit 64 and sprayed onto threads 40 within chamber 56. Flexible seals 67 are preferably provided about the openings 69 in the sides of chamber 56, through which the threads pass to restrict the amount of airborne fluoride passing through openings 69 into the atmosphere.

The individual threads 40 with the fluoride powder deposited thereon are then drawn by the ball warper 42 from the spray station 54 to a drying station 68 which, for example, could comprise a tunnel 70 having heat lamps 72 mounted therein, as seen in FIG. 6. The fluoride impregnated threads 40 pass through tunnel 70 and are dried by the heat from lamps 72. As the threads dry and pores therein close, fluoride particles are secured to the threads. The dried impregnated threads are then gathered by the ball warper 42 and twisted in a conventional manner with a plurality of similarly impregnated threads so as to form the impregnated threads into a strand of twisted impregnated threads. Preferably a plurality of such impregnated strands are employed in the core 14, either in parallel alignment or twisted together, as for example, in a rope forming pattern.

To complete the manufacture of the chew toy 10 having a single central core as illustrated in FIGS. 1 and 3, three skeins 17, 19 and 21 of twisted cotton or other soft pliable threads are then twisted about the impregnated strand or strands comprising core 14 in a conventional rope forming pattern so as to define the impregnated cotton rope 15. The impregnated rope is then formed into the desired chew toy configuration as described above.

If natural plant fibers such as sisal were to be utilized in the formation of core 14 in lieu of a synthetic core, the same impregnation process described above could be employed except that the sisal core would be formed prior to the application of the therapeutic agent or agents. Accordingly, a single strand of twisted sisal fibers or a plurality of parallel or twisted strands of twisted sisal fibers, depending on the desired core configuration, would be drawn from a carrying spool (not shown), through one or more guides to and through the misting station 50, fluoride spray station 56 and the drying station 68. The impregnated fiber strand or strands could then be collected on a secondary spool or fed directly to a ball warper where the soft pliable threads would be twisted about the core in a conventional rope forming pattern to form the outer shell of the toy. While a synthetic core could also be formed prior to impregnation like a natural plant core, synthetic threads are generally much easier to handle individually then sisal or similar nature fiber threads which allows the synthetic threads to be individually impregnated, resulting in a more uniformed distribution of the therapeutic agent or agents throughout the core. While such individual thread impregnation might be achieved with sisal threads, it would be a more difficult and costly process than simply impregnating a formed sisal core.

The formation of the preferred embodiment of the chew toy in which each skein comprises soft pliable threads twisted about a separate core, as shown in FIG. 3, is achieved by essentially the same process described above. Three individual cores 30 are formed and impregnated or impregnated and formed as described above. Thereafter, cotton or other soft pliable threads are twisted about each of the impregnated cores to form three impregnated composite skeins 22, 24 and 26. The skeins are then twisted in a conventional rope forming process to form a length of impregnated composite rope 32 and the rope is then formed into the desired chew toy configuration. While this embodiment of the invention is shown and described as comprising three skeins as in a conventional rope, a different number of composite skeins could be formed and employed in the formation of the chew toy without departing from the spirit and scope of the present invention.

As an alternative to the above-described process, the powdered fluoride can be adhered to the core by ionic bonding. While not specifically illustrated, this process is described with reference to FIG. 4. In such a process, the following guides 46 and collecting and spacing guide 48 are constructed of a suitable plastic or metal material such that when the individual threads of which the core 14 or cores 30 are to be formed pass therethrough at a relatively rapid rate of about ten to twelve feet per second, an electrostatic charge is imparted to the threads. In such a process, care should be taken to avoid grounding the threads and dissipating the charge. The charged threads are then drawn directly from the collecting and spacing guide 48 to the spray station 54. A misting station is not employed. If the core is to be formed of sisal or other similar natural plant fibers, the preformed sisal core is directed through a series of similar guides to impart an electrostatic charge to the twisted fibers in the formed core. The charged core is then directed to the spray station 54.

The chamber 56 in spray station 54 is ionized to impart a negative charge to the airborne powdered fluoride therein. The charged fluoride particles are blown about the interior of chamber 56 by blower 62 so that they contact the threads being drawn through the chamber by the ball warper as in the prior process. The charged particles within chamber 56 are attracted to and ionically bond with the statically charged threads. The remainder of the process is identical to that previously described, except that the elimination of the misting station obviates the need for a drying station.

The fluoride which is applied to the threads 40 could be either calcium or sodium fluoride. The preferred concentration of the fluoride powder on the cotton threads is about two percent by weight. In addition to or lieu of fluoride other agents could be applied in particulate form to the core 14 or cores 30 as above described. Examples of such agents include: chlorhexadine to prevent the formation of tartar and plague; sodium bicarbonate or yucca extract to prevent bacteria growth; copper gluconate as a breath freshener; and anise as a flavoring.

Fluoride can also be applied to the threads comprising core 14 or cores 30 in an aqueous solution. This can be achieved either by spraying the solution onto the threads as illustrated in FIG. 8, or by passing the threads through a bath of the solution as illustrated in FIG. 7. The aqueous solution preferably contains about six percent by weight fluoride and one-half percent polyvinyl alcohol. The polyvinyl alcohol renders the solution more viscous to enhance the bonding of the fluoride to the cotton rope.

When fluoride is sprayed onto the individual threads 40 in an aqueous solution, the process differs from that illustrated in FIG. 1 only in the configuration of the spray station and the fact that a misting station is not employed. As seen in FIG. 8, as the threads 40 pass from the collecting and spacing guide 50 to the spray station 55, the fluoride solution is sprayed directly onto the threads through nozzles 57 mounted in the spray chamber in a sufficiently dense mist to obtain the desired saturation of the individual threads. The saturated threads then pass from the spray chamber to a drying station 68 and the process is completed as above-described. If the core is formed of sisal or other natural plant fibers wherein it is preferable to impregnate the preformed core as opposed to the individual threads, the strands of sisal are simply sprayed with the acqueous, passed to the drying station and processed as above described.

More preferably, a fluoride bath is employed when the fluoride is applied to the threads in an aqueous solution. As seen in FIG. 7, the fluoride bath 80 is held within a container 82 and the threads 40 or formed cores 14 or 30 are directed into the bath from a guide 84 by a series of roller guides 86. As the threads or formed core are drawn through the bath by the ball warper 42, other suitable moving means, they are directed about one or more vertically adjustable roller guides 88 mounted within container 82 and over a series of downstream roller guides 90 which direct the threads or core from the fluoride bath, past a drying station 92 to the ball warper 42. The drying station 92 could comprise a heated tunnel as shown in FIG. 6, an electric heater 94 as illustrated in FIG. 7, a blower or any other suitable means for drying the threads or core. By varying the elevation of the guides 88 within container 82, time which the threads or core are immersed in the bath is varied and thus, the degree of saturation of the core threads with the fluoride solution can be regulated independently of the rate at which the threads are moved. This allows for independent adjustments of the fluoride saturation and the drying time. An agitator 96 is also preferably provided for periodically agitating the solution to prevent the fluoride from settling to the bottom of container 82. It should be noted that certain agents such as sodium bicarbonate and anise should be applied in a dry powder form as they are not well suited for use in an aqueous solution.

Another method of applying therapeutic agents to the threads comprising cores 14 and 30 employs encapsulating the agent in porous polymeric beads, the formation of which is disclosed in U.S. Pat. No. 4,690,825. These beads are marketed under the name MICROSPONGES by Advanced Polymer Systems, Inc. and can be applied to the threads 40 or a preformed fiber core utilizing the process illustrated in FIGS. 4 and 5 for depositing agents in a powdered form onto the threads. The encapsulated agent simply replaces the fluoride or other powdered agent in hopper 58 and is deposited on the moistened threads within spray chamber 56 by means of blower 62 in the same manner described above with respect to the powdered fluoride. Alternatively, the beads can be given a strong negative ionic charge so that they will strongly adhere to statically charged core threads. By either method of application, the beads are distributed along and adhere to the core threads such that upon the core being encased by the outer cotton threads, the encapsulated particles are uniformly dispersed through the core of the toy. The porous polymer beads will retain the agent encapsulated therein and later release the agent under the friction exerted thereon by the dog's teeth.

While the use of these polymeric beads to encapsulate the agents will extend the useful life of the agents in the chew toy by retarding its release, it has been found that such beads cannot contain a sufficient amount of fluoride so as to provide an efficient means for impregnating the core with fluoride. Such beads, however, appear well suited for use with other therapeutic agents. Unlike the other methods described above for impregnating the chew toy core or cores when two or more therapeutic agents are employed in the same toy the agents should not be mixed. Each agent should be separately encapsulated.

Yet another method of impregnating the core or cores of the chew toy with one or more therapeutic agents comprises the use of dry injections. In this process, the chew toy could be formed prior to the addition of the therapeutic agent or agents. After the toy is formed, the toy is fed to an injection station where the plurality of spaced needles are oriented such that they can pierce the outer cotton shell of the toy and project into the core or cores at spaced intervals thereon. The therapeutic agent or agents would then be injected in a dry powder form directly into the core along the length or lengths thereof. While such a process may not provide as complete a saturation of the core or cores with the therapeutic agents as the processes described above, a dry injection of process does provide economical means of impregnating the core which avoids the need to moisten and dry or electrostatically charge the core to effect the impregnation of the therapeutic agents therein.

While cores comprised of natural fibers such as sisal have certain advantages over cores comprised of synthetic fibers as noted above, the use of synthetic fibers does allow for a color coding of the chew toy to identify the therapeutic agent or agents contained therein. In the preferred configuration of the toy illustrated in FIG. 1, the frayed ends 100 of the toy proximate end knots 13 expose the end portions of the core to view. By color coding the synthetic cores to correspond to the therapeutic agent or agents contained within the core, the pet owner is provided with a means for readily identifying the therapeutic agent or agents being deposited on the dog's teeth and gums when a particular toy is being chewed. Thus, the pet owner can easily control the application of the different therapeutic agents to the dog by periodically varying the particular chew toy with which the dog is playing.

Finally, as noted, above, the configuration of the chew toy of the present invention is not limited to the configuration illustrated in FIG. 1. The toy could be configured from the impregnated composite ropes 15 and 32 into a wide variety of chew or tug toy configurations. Various other changes and modifications may be made in carrying out the present invention without departing from the spirit and scope thereof. Insofar as these changes and modifications are within the purview of the appended claims, they are to be considered as part of the present invention.

I claim:

1. A chew toy for dogs comprising a plurality of soft pliable threads twisted about a plurality of twisted fibers so as to substantially encase and retain said fibers within said pliable threads, and at least one therapeutic dental agent carried by said fibers, said at least one agent being retained within said toy by said fibers and said strands of soft pliable threads and, upon said toy being chewed by a dog, said soft pliable threads provide a cleaning of the dog's teeth and a massaging of its gums and a portion of said at least one dental agent is released onto the teeth and gums of the dog.

2. The chew toy of claim 1 wherein said at least one dental agent is fluoride, sodium bicarbonate or chlorhexadine.

3. The chew toy of claim 1 wherein said at least one dental agent is encapsulated in porous polymeric beads.

4. The chew toy of claim 1 wherein said at least one dental agent is ionically bonded to said fibers.

5. A chew toy for dogs comprising a plurality of soft pliable threads twisted about a plurality of twisted fibers so as to substantially encase and retain said fibers within said pliable threads, and a breath freshening agent carried by said fibers, said agent being retained within said toy by said fibers and said strands of soft pliable threads and, upon said toy being chewed by a dog, said soft pliable threads provide a cleaning of the dog's teeth and a massaging of its gums and a portion of said dental agent is released onto the teeth and gums of the dog.

6. The chew toy of claim 5 wherein said breath freshening agent is copper gluconate.

7. The chew toy of claim 5 including a therapeutic dental agent selected from the group consisting of fluoride, sodium bicarbonate and chlorhexadine.

8. A chew toy for dogs comprising a plurality of soft pliable threads twisted about a plurality of twisted fibers so as to substantially encase and retain said fibers within said pliable threads, and a flavoring agent carried by said fibers, said agent being retained within said toy by said fibers and strands of soft pliable threads and, upon said toy being chewed by a dog, said soft pliable threads provide a cleaning of the dog's teeth and a massaging of its gums and a portion of said flavoring agent is released onto the teeth and gums of the dog.

9. A chew toy for dogs comprising a plurality of soft pliable threads twisted about a plurality of natural plant fibers so as to substantially encase and retain said fibers within said pliable threads, said fibers being impregnated with a therapeutic dental agent so as to dispose said agent within and along said toy whereby said agent is retained within said toy by said plant fibers and said strands of soft pliable threads and, upon said toy being chewed by a dog, said soft pliable threads provide a cleaning of the dog's teeth and a massaging of its gums, said plant fibers provide the toy with a crunching sound a texture and a portion of said dental agent is released onto the teeth and gums of the dog.

10. The chew toy of claim 9 wherein said soft pliable threads are comprised of cotton fibers and wherein said natural plant fibers are sisal fibers.

11. The chew toy of claim 9 wherein said therapeutic dental agent is fluoride, sodium bicarbonate or chlorhexadine.

12. The chew toy of claim 9 wherein said dental agent is encapsulated in porous polymeric beads.

13. The chew toy of claim 9 wherein said dental agent is ionically bonded to said plant fibers.

14. A chew toy for dogs comprising a plurality of pliable threads twisted about a plurality of natural plant fibers so as to substantially encase and retain said fibers within said pliable threads, said fibers being impregnated with a breath freshening agent so as to dispose said agent within and along said toy whereby said agent is retained within said toy by said plant fibers and said strands of soft pliable threads and, upon said toy being chewed by a dog, said soft pliable threads provide a cleaning of the dog's teeth and a massaging of its gums, said plant fibers provide the toy with a crunching sound a texture and a portion of said agent is released onto the teeth and gums of the dog.

15. The chew toy of claim 14 wherein said breath freshening agent is copper gluconate.

16. A chew toy for dogs comprising a plurality of soft pliable threads twisted about a plurality of natural plant fibers so as to substantially encase and retain said fibers within said pliable threads, said fibers being impregnated with a flavoring agent so as to dispose said agent within and along said toy whereby said flavoring is retained within said toy by said plant fibers and said strands of soft pliable threads and, upon said toy being chewed by a dog, said soft pliable threads provide a cleaning of the dog's teeth and a massaging of its gums, said plant fibers provide the toy with a crunching sound and texture and a portion of said agent is released onto the teeth and gums of the dog.

17. A chew toy for dogs comprising a plurality of composite strands, each of said strands being formed of soft pliable threads twisted about and substantially encasing a plurality of inner twisted fibers, said inner twisted fibers being less water absorbent than said soft pliable threads and being impregnated with at least one therapeutic dental agent, said strands being twisted together to define a length of impregnated composite rope, and means disposed proximate the ends of said rope for maintaining said strands in a twisted disposition.

18. The chew toy of claim 17 wherein said dental agent is selected from the group consisting of fluoride, sodium bicarbonate and chlorhexadine.

19. The chew toy of claim 17 wherein said maintaining means comprises a pair of knots formed by said rope.

20. A chew toy for dogs comprising a plurality of composite strands, each of said strands being formed of soft pliable threads twisted about and substantially encasing a plurality of inner twisted fibers, said inner twisted fibers being less water absorbent than said soft pliable threads and being impregnated with a breath freshening agent, said strands being twisted together to define a length of impregnated composite rope, and means disposed proximate the ends of said rope for maintaining said strands in a twisted disposition.

21. The chew toy of claim 20 wherein breath freshening agent is copper gluconate.

22. A chew toy for dogs comprising a plurality of composite strands, each of said strands being formed of soft pliable threads twisted about and substantially encasing a plurality of inner twisted fibers, said inner twisted fibers being less water absorbent than said soft pliable threads and being impregnated with a flavoring agent, said strands being twisted together to define a length of impregnated composite rope, and means disposed proximate the ends of said rope for maintaining said strands in a twisted disposition.

23. A process for forming a chew toy for dogs having a therapeutic dental agent impregnated therein for release of a portion thereof onto the teeth and gums of a dog upon being chewed by the dog, said process comprising the steps of: applying a therapeutic dental agent onto a plurality of threads of twisted fibers; twisting a plurality of soft pliable threads about said threads of twisted fibers so as to define a length of composite rope comprised of said soft pliable threads disposed about said threads of twisted fibers and said dental agent; and forming said rope into a desired chew toy configuration.

24. The process of claim 23 wherein said applying step comprises wetting said threads of twisted fibers; passing said threads of twisted fibers through an airflow containing said dental agent; and drying said threads of twisted fibers.

25. The process of claim 23 including the step of encapsulating said dental agent in porous polymeric beads prior to applying said agent to said twisted fibers.

26. The process of claim 23 wherein said applying step comprises passing said twisted fibers through an aqueous solution containing said dental agent and drying said threads of twisted fibers.

27. The process of claim 23 wherein said applying step comprises spraying an aqueous solution containing said dental agent onto said threads of twisted fibers and drying said threads of twisted fibers.

28. The process of claim 23 including the step of applying a breath freshening agent to said threads of twisted fibers prior to twisting said soft pliable threads about said threads of twisted fibers.

29. A process for forming a chew toy for dogs having a therapeutic dental agent impregnated therein for release of a portion thereof onto the teeth and gums of a dog upon being chewed by the dog; said process comprising the steps of: applying an aqueous solution containing said therapeutic dental agent onto a plurality of threads; drying said threads; twisting said threads so as to define a strand of twisted threads carrying said agent; twisting a plurality of soft pliable threads about said strand containing said agent so as to define a composite skein; twisting a plurality of said composite impregnated skeins together so as to define a length of composite rope carrying said agent; and forming said rope into a desired chew toy configuration.

30. The process of claim 29 wherein said applying step comprises spraying said therapeutic dental agent in an aqueous solution onto said twisted fibers.

31. The process of claim 29 wherein said applying step comprises passing said threads through a bath of an aqueous solution containing said therapeutic dental agent.

32. The process of claim 31 wherein said bath of aqueous solution is comprised of about six percent by weight of fluoride particles and about one half percent by weight of polyvinyl alcohol.

33. A process for forming a chew toy for dogs having a therapeutic dental agent impregnated therein for release of a portion thereof onto the teeth and gums of a dog upon being chewed by the dog; said process comprising the steps of wetting a plurality of threads of twisted fibers; applying said therapeutic dental agent to said threads; drying said threads; twisting a plurality of soft pliable threads about said threads of twisted fibers so as to define a composite skein; twisting a plurality of said composite skeins together so as to define a length of composite rope carrying said agent; and forming said rope into a desired chew toy configuration, 34. The process of claim 33 wherein said applying step comprises passing said wetted threads of twisted fibers through an airflow containing said therapeutic dental agent.

35. The process of claim 33 including the steps of encapsulating said therapeutic agent in porous polymer beads prior to applying agent to said threads.

36. The process for forming a chew toy for dogs having a therapeutic dental agent impregnated therein for release of a portion thereof onto the teeth and gums of a dog upon being chewed by the dog, said process comprising the steps of: imparting a static charge to a plurality of threads of twisted fibers; applying particles of said dental agent to said threads such that said particles are ionically bonded thereto; twisting a plurality of soft pliable threads about said threads of twisted fibers so as to define a length of rope comprised of said soft pliable threads disposed about said threads of twisted fibers and said agent; and forming said rope into a desired chew toy configuration.

37. The process of claim 36 wherein said applying step comprises passing said threads of twisted fibers through an airflow containing said particles of said agent.

38. The process of claim 36 including the step of imparting a positive electrical charge to said agent particles such that said particles are ionically attracted to said charged threads of twisted fibers, and wherein said applying step comprises passing said threads of twisted fibers through an airflow containing said electrically charged agent particles.

39. A process for forming a chew toy for dogs having a therapeutic dental agent impregnated therein for release of a portion thereof onto the teeth and gums of a dog upon being chewed by the dog; said process comprising the steps of: twisting a plurality of soft pliable threads about a plurality of threads of twisted fibers so as to define a plurality of composite skeins; twisting said composite skeins together so as to define a length of composite rope; forming said rope into a desired chew toy configuration and injecting a therapeutic dental agent into said twisted fibers at spaced intervals along said rope so as to impregnate said rope with said therapeutic dental agent.

40. A process for forming a chew toy for dogs having a breath freshening agent impregnated therein for release of a portion thereof onto the teeth and gums of a dog upon being chewed by the dog, said process comprising the steps of: applying a breath freshening agent onto a plurality of threads of twisted fibers; twisting a plurality of soft pliable threads about said threads of twisted fibers so as to define a length of composite rope comprised of said soft pliable threads disposed about said threads twisted fibers and said dental agent; and forming said rope into a desired chew configuration.

41. A process for forming a chew toy for dogs having a breach freshening agent impregnated therein for release of a portion thereof onto the teeth and gums of a dog upon being chewed by the dog; said process comprising the steps of: applying an aqueous solution containing said breath freshening agent onto a plurality of threads; drying said threads; twisting said threads so as to define a strand of twisted threads carrying said agent; twisting a plurality of soft pliable threads about said strand containing said agent so as to define a composite skein; twisting a plurality of said composite skeins together so as to define a length of composite rope carrying said agent; and forming said rope into a desired chew toy configuration.

42. A process for forming a chew toy for dogs having a breath freshening agent impregnated therein for release of a portion thereof onto the teeth and gums of a dog upon being chewed by the dog; said process comprising the steps of wetting a plurality of threads of twisted fibers; applying said breath freshening agent to said threads; drying said threads; twisting a plurality of soft pliable threads about said threads of twisted fibers so as to define a composite skein; twisting a plurality of said composite skeins together so as to define a length of composite rope carrying said agent; and forming said rope into a desired chew toy configuration.

43. A process for forming a chew toy for dogs having a flavoring agent impregnated therein for release of a portion thereof onto the teeth and gums of a dog upon being chewed by the dog, said process comprising the steps of: applying a flavoring agent onto a plurality of threads of twisted fibers; twisting a plurality of soft pliable threads about said threads of twisted fibers so as to define a length of composite rope comprised of said soft pliable threads disposed about said threads twisted fibers and said flavoring agent; and forming said rope into a desired chew configuration.

44. A chew toy for dogs comprising a plurality of soft pliable threads twisted about a plurality of strands of twisted threads so as to substantially encase and retain said twisted threads within said pliable threads, said twisted threads being less absorbent than said soft pliable threads, a therapeutic agent carried by said twisted threads, said agent being retained within said toy by said soft pliable threads such that upon being chewed by a dog, said soft pliable threads provide a cleaning of the dog's teeth and a massaging of its gums and a portion of said agent will be released onto the teeth and gums of the dog.

45. The chew toy of claim 44 wherein said therapeutic agent is selected from the group consisting of fluoride, sodium bicarbonate, chlorhexadine and copper gluconate.

* * * * *